2,964,216

COATING METALS WITH PROTECTING LAYERS

Sigismund Kienow, Dortmund, Germany, assignor to Manufacturers Chemical Corporation, New York, N.Y., a corporation of New York No Drawing. Filed Apr. 6, 1960, Ser. No. 20,277

5 Claims. (Cl. 220—64)

This invention relates to coating metals with protecting layers and is herein illustrated as embodied in melting pots suitable for melting zinc or other metals. The molten non-ferrous metal often is poured, so that without some protection, the molten zinc or other molten metal attacks the metal of the melting pot, usually iron.

According to the present invention an alkyl-aryl silicone may be admixed with a silicate enamel material to form with a suitable carrier, a sprayable coating to protect the melting pot against corrosion at the high heat of the molten metal.

Paints have been made carrying aluminum powder which raised the melting point of the paint when dried so that the paint became a protection against the weather.

According to the present invention, an empirical methyl phenyl siloxane resin or resins may form the resin element in a paint carrying a large amount of a silicate enamel material which is adapted to dry on the metal surface of the melting pot and form a coating apparently unwettable by the molten metal lying in the melting pot.

The suitable methyl phenyl siloxanes are "cured" at about 480° F. by heating them to that temperature for about an hour thus being dried in situ on the pot.

The solid ingredients of this paint are generally carried in xylene but if preferred some solvent naphthas or solvent ketones or solvent higher alcohols may be substituted, as well as some other commercial organic solvents. Some of the suitable siloxanes referred to above are produced and marketed by Dow Corning under the trade names of "802," "803" and "805" which are recommended for use alone or in combination with each other.

According to the present invention it is usually unnecessary to mix the siloxanes for the purpose in hand although those that are miscible may be sometimes profitably mixed for special purposes.

One form of suitable reactions for producing the desired siloxanes is described in the patent in Rochow, #2,442,212. Other stages in the reactions are described beginning at page 56 of Introduction to Chemistry of the Silicones by Rochow, N.Y., 1951.

According to the present invention a methyl phenyl siloxane resin curable at 480° F. dissolved with about an equal weight of xylene was mixed with about three times its weight of a silica based enamel material and the whole thinned with the same or a compatible solvent of suitable thickness for spraying. The materials are preferably all low in iron content.

There was also added a fraction of a percent of a cobalt drier.

One coating material was made as follows:

80 to 85 parts of native Forsterite, or preferably of a synthetic composition functioning like Forsterite ($2MgOSiO_2$), ground to a size of 20 microns was mixed with a silica boric acid flux such as:

10 parts of frits composed of:
    $SiO_2$ 50%–54%
    $B_2O_3$ 22%
    $Al_2O_3TiO_2$ 15%
    CaO 9%

5 to 8 parts $MgO_2$, all similarly ground 0.5 part cobalt oxide, adapted to serve as a dryer All these finely ground to be suitable for spraying were mixed with 35–40 parts of liquid siloxane resin No. 805.

The thick liquid mixture was sprayed to form a thin coating as a lining of an iron melting pot about 3 to 5 thousandths of an inch thick and dried for one hour, at a so-called curing temperature of about 480° F.

Then they were heated to operating temperature of a little over 900° F.

To guard against possible pin holes a second similar coat was often applied over the first coat and similarly heated.

The use of silica enamel material instead of aluminum makes possible the use of the silicone compounds such as siloxanes, because the siloxanes apparently would seriously attack an aluminum paint filler at the temperatures of working and might even alloy with the molten zinc or other metal. The Forsterite was especially useful to make a permanent coating since it has about the same coefficient of expansion by heat as does iron. A coating of about 20 microns was useful.

It has been found that the same silicone based coating resists other non-ferrous metals which might attack iron.

Having thus described certain embodiments of the invention what is claimed is:

1. A coating material adapted to adhere to iron at a temperature of about 900° F. consisting of solids having the approximate composition of Forsterite admixed with a much less quantity of boro-silicate nearly iron-free frit carried in a volatile organic solvent and an organic siloxane of methyl phenyl adapted to function as a resin and soluble in said solvent.

2. A coating material adapted to adhere to iron at a temperature of about 900° F. consisting of solids having the approximate composition of Forsterite admixed with a much less quantity of boro-silicate nearly iron-free frit carried in xylene and an organic siloxane of methyl phenyl adapted to function as a resin and soluble in said solvent.

3. A iron container carrying a coating hardened at about 900° F., said coating being a heat modified methyl phenyl silicone intermixed with heat modified Forsterite and a less quantity of a boro-silicate frit.

4. An iron container carrying a coating cured at about 480° F. and carrying the residue of Forsterite a less quantity of a boro-silicate frit and the residue of a methyl phenyl siloxane curable at that temperature.

5. The process of protecting an iron container from attack by a non-ferrous molten metal which consists in covering it with a composition consisting of solids having the approximate composition of Forsterite admixed with a much less quantity of boro-silicate nearly iron-free frit carried in a volatile organic solvent and an organic siloxane of methyl phenyl adapted to function as a resin and soluble in said solvent and curing the coating by heating to about 480° F.

No references cited.